(12) United States Patent
Cho

(10) Patent No.: US 8,999,543 B2
(45) Date of Patent: Apr. 7, 2015

(54) RECHARGEABLE BATTERY WITH LARGER CURVED ENDS HAVING DIFFERENT RADIUS OF CURVATURE

(75) Inventor: Eun-Bee Cho, Yongin-Si (KR)

(73) Assignee: Samsung SDI Co., Ltd., Yongin-si (KR)

(*) Notice: Subject to any disclaimer, the term of this patent is extended or adjusted under 35 U.S.C. 154(b) by 258 days.

(21) Appl. No.: 12/874,037

(22) Filed: Sep. 1, 2010

(65) Prior Publication Data

US 2011/0070471 A1 Mar. 24, 2011

Related U.S. Application Data

(60) Provisional application No. 61/244,205, filed on Sep. 21, 2009.

(51) Int. Cl.
| | | |
|---|---|---|
| *H01M 4/133* | (2010.01) | |
| *H01M 4/134* | (2010.01) | |
| *H01M 2/02* | (2006.01) | |
| *H01M 10/04* | (2006.01) | |

(Continued)

(52) U.S. Cl.
CPC ............ *H01M 10/0431* (2013.01); *H01M 4/13* (2013.01); *H01M 10/052* (2013.01); *H01M 10/0587* (2013.01); *H01M 2006/106* (2013.01); *Y02E 60/122* (2013.01); *Y02T 10/7011* (2013.01)

(58) Field of Classification Search
CPC .......... H01M 10/0431; H01M 10/052; H01M 10/0587; H01M 4/13
USPC ............ 429/209, 176, 161, 164, 94, 129, 208
See application file for complete search history.

(56) References Cited

U.S. PATENT DOCUMENTS

| | | |
|---|---|---|
| 7,273,679 B2 | 9/2007 | Yoon et al. |
| 7,790,313 B2 | 9/2010 | Lee |

(Continued)

FOREIGN PATENT DOCUMENTS

| | | |
|---|---|---|
| CN | 1728432 A | 2/2006 |
| CN | 101471451 A | 7/2009 |

(Continued)

OTHER PUBLICATIONS

Machine Translation of: KR 102000051739 A, Hwang, Aug. 16, 2000.*

(Continued)

*Primary Examiner* — Kenneth Douyette
(74) *Attorney, Agent, or Firm* — Knobbe Martens Olson & Bear LLP

(57) ABSTRACT

The present invention relates to a rechargeable battery that can use a negative electrode active material having a high volume expansion rate by receiving volume variation of an electrode assembly in a case. The rechargeable battery according to the present invention includes i) an electrode assembly including a positive electrode plate, a negative electrode plate, and a separator that are wound in a jelly roll shape to have a flat portion and curved portions disposed at both sides of the flat portion, ii) a case for receiving the electrode assembly, and iii) a cap assembly combined with the case to close and seal the case and that is electrically connected to the electrode assembly. When a direction that is perpendicular to a surface of the separator disposed in the flat portion is set to a first direction, the thickness of the flat portion measured along the first direction is smaller than the maximum thickness of the curved portion measured along the first direction.

11 Claims, 9 Drawing Sheets

(51) Int. Cl.
*H01M 4/13* (2010.01)
*H01M 10/052* (2010.01)
*H01M 10/0587* (2010.01)
*H01M 6/10* (2006.01)

(56) References Cited

U.S. PATENT DOCUMENTS

| | | | |
|---|---|---|---|
| 2003/0138693 A1* | 7/2003 | Suzuki et al. | 429/162 |
| 2004/0197639 A1* | 10/2004 | Honda et al. | 429/94 |
| 2005/0123829 A1 | 6/2005 | Fukui et al. | |
| 2006/0024578 A1* | 2/2006 | Lee | 429/208 |
| 2006/0093910 A1* | 5/2006 | Yoon et al. | 429/209 |
| 2006/0222944 A1* | 10/2006 | Yamamoto et al. | 429/218.1 |
| 2007/0141452 A1* | 6/2007 | Kim | 429/120 |
| 2009/0087731 A1 | 4/2009 | Fukui et al. | |
| 2009/0169993 A1* | 7/2009 | Ohashi et al. | 429/209 |

FOREIGN PATENT DOCUMENTS

| | | | | |
|---|---|---|---|---|
| JP | 2003109869 A | * | 4/2003 | H01G 9/048 |
| JP | 2004-63325 A | | 2/2004 | |
| JP | 2005-166530 A | | 6/2005 | |
| JP | 2009-081105 A | | 4/2009 | |
| JP | 2009-099523 A | | 5/2009 | |
| JP | 2009-158376 A | | 7/2009 | |
| KR | 10-2000-0051739 A | | 8/2000 | |
| KR | 10-2005-0113860 A | | 12/2005 | |
| KR | 10-2006-0037594 A | | 5/2006 | |

OTHER PUBLICATIONS

Machine Translation of: JP 2003/109869 A, Ashino, Apr. 11, 2003.*
Office Action dated May 16, 2012 for corresponding KR Application No. 10-2010-0087995.
Office Action dated Feb. 17, 2013 for corresponding CN Application No. 201010286369.5.
Office Action dated Nov. 27, 2012 for corresponding JP Application No. 2010-209410.
Office Action dated Oct. 11, 2013 for corresponding CN Application No. 201010286369.5.

* cited by examiner

RECHARGEABLE BATTERY WITH LARGER CURVED ENDS HAVING DIFFERENT RADIUS OF CURVATURE

CROSS-REFERENCE TO RELATED APPLICATION

This application claims priority to the Provisional Application No. 61/244,205, filed in the United Stated Patent Office on Sep. 21, 2009, the content of which is incorporated herein by reference.

BACKGROUND OF THE INVENTION

1. Field of the Invention

The present invention relates to a rechargeable battery. More particularly, the present invention relates to a rechargeable battery having an electrode assembly that has an improved shape.

2. Description of the Related Art

Unlike a primary battery that cannot be recharged, a rechargeable battery can be repeatedly charged and discharged. Low-capacity rechargeable batteries are used for portable compact electronic apparatuses such as mobile phones, notebook computers, and camcorders, and high-capacity rechargeable batteries are widely used as a power source for driving a motor of a hybrid vehicle, etc.

The rechargeable battery includes an electrode assembly having a positive electrode plate and a negative electrode plate are disposed and a separator interposed therebetween. The battery also includes a cap assembly that closes and seals the case and is electrically connected to the electrode assembly. In the case of a prismatic rechargeable battery, an electrode assembly is wound in a jelly roll shape so as to include a flat portion and curved portions disposed at both sides of the flat portion, and the flat portion is positioned closely adjacent to an inner wall of the case.

In a charging/discharging process of the above rechargeable battery, volume of the electrode assembly varies. For example, in a lithium ion battery, a negative electrode active material of a negative electrode plate occludes lithium ions during a charging process so that the volume of the negative electrode active material expands, and emits the lithium ions during a discharging process so that the volume is reduced. As described, the electrode assembly repeats expansion and reduction whenever a charging/discharging cycle is repeated.

However, most cases, excluding a pouch-type case, are rigid bodies formed of metal so that the case cannot accommodate the volume expansion of the electrode assembly. Therefore, various methods including reducing capacity of the electrode assembly to match internal capacity of the case or changing a spiral-winding structure of the electrode assembly have been suggested to deal with the volume expansion of the electrode assembly.

However, charging/discharging capacity of the rechargeable battery is also reduced when the capacity of the electrode assembly is reduced so that performance of the rechargeable battery is deteriorated. In addition, when the spiral-winding structure of the electrode assembly is changed, the shape and a manufacturing process of the electrode assembly are complicated so that production efficiency of the rechargeable battery is deteriorated.

SUMMARY OF THE INVENTION

The present invention has been made in an effort to provide a rechargeable battery having advantages of reforming the shape of an electrode assembly for receiving volume expansion of the electrode assembly in a case to increase charging/discharging capacity and output performance.

A rechargeable battery according to an exemplary embodiment of the present invention includes i) an electrode assembly including a positive electrode plate, a negative electrode plate, and a separator that are wound in a jelly roll shape to have a flat portion and curved portions disposed at both sides of the flat portion, ii) a case for receiving the electrode assembly, and iii) a cap assembly combined with the case to close and seal the case and electrically connected to the electrode assembly.

When a direction that is perpendicular to a surface of the separator disposed in the flat portion is set to a first direction, the thickness of the flat portion, measured along the first direction, is smaller than the maximum thickness of the curved portion, measured along the first direction.

The curved portion may include a first outermost curved portion located in the outermost portion of a second direction that is perpendicular to the first direction, and when the center of a curvature of the first outermost curved portion is set to a first center point, the width of the flat portion, measured along the second direction, may be smaller than an interval of a pair of first center points within a distance between the pair of first center points.

The curved portion may further include a second outermost curved portion that connects the first outermost curved portion and the flat portion. A curvature of the second outermost curved portion may be greater than, equal to, or smaller than that of the first outermost curved portion.

The positive electrode plate may include a first current collector and a positive electrode active material layer, and the negative electrode plate may include a second current collector and a negative electrode active material layer. The positive and negative active material layers may be formed over the entire area of the flat portion and the curved portion.

Alternatively, the positive and negative active material layers may be intermittently formed in the electrode assembly. The positive and negative active material layers may be formed in the flat portion, excluding the curved portion, or may be formed in the flat portion and between the flat portion and the first center point.

The negative active material layer may include a negative electrode active material having a volume expansion rate of higher than 10%. The negative active material may include at least one selected from a group including silicon, a silicon oxide material, and a silicon-carbon composite.

The flat portion may be disposed at a distance from an inner wall of the case. The case may have a prismatic shape.

In another implementation, the aforementioned needs are satisfied by an electrode assembly for a rechargeable battery, the electrode assembly having a positive and negative electrode and a separator interposed therebetween. In this implementation, the electrodes and separators are wound so that the resulting wound electrode assembly defines a first cross-sectional shape having a first curved portion, a second curved portion and a flat portion interposed between the first and second curved portions. In this implementation, the flat portion has a width dimension that is less than the width dimension of the first and second curved portions.

According to the exemplary embodiments of the present invention, a space for receiving volume expansion of the electrode assembly is provided in the case so that the negative electrode plate can be made of a negative electrode active material having a high volume expansion rate and excellent efficiency. Accordingly, capacity and energy density of the rechargeable battery can be increased, thereby improving output efficiency.

DETAILED DESCRIPTION OF THE EMBODIMENTS

Figure 1:
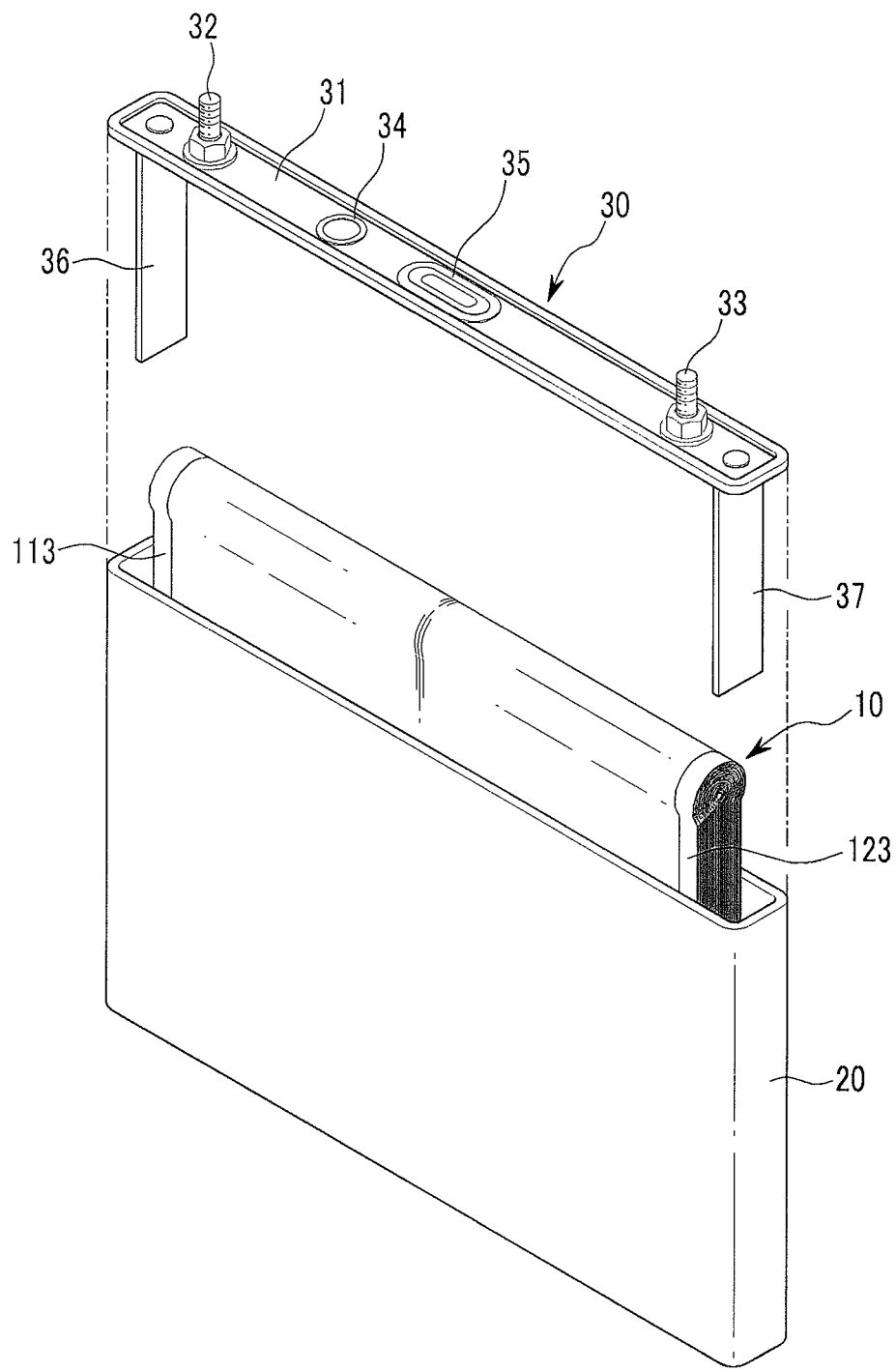
FIG. 1 is an exploded perspective view of a rechargeable battery according to a first exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. Like reference numerals designate like constituent elements throughout the specification.

Figure 2:
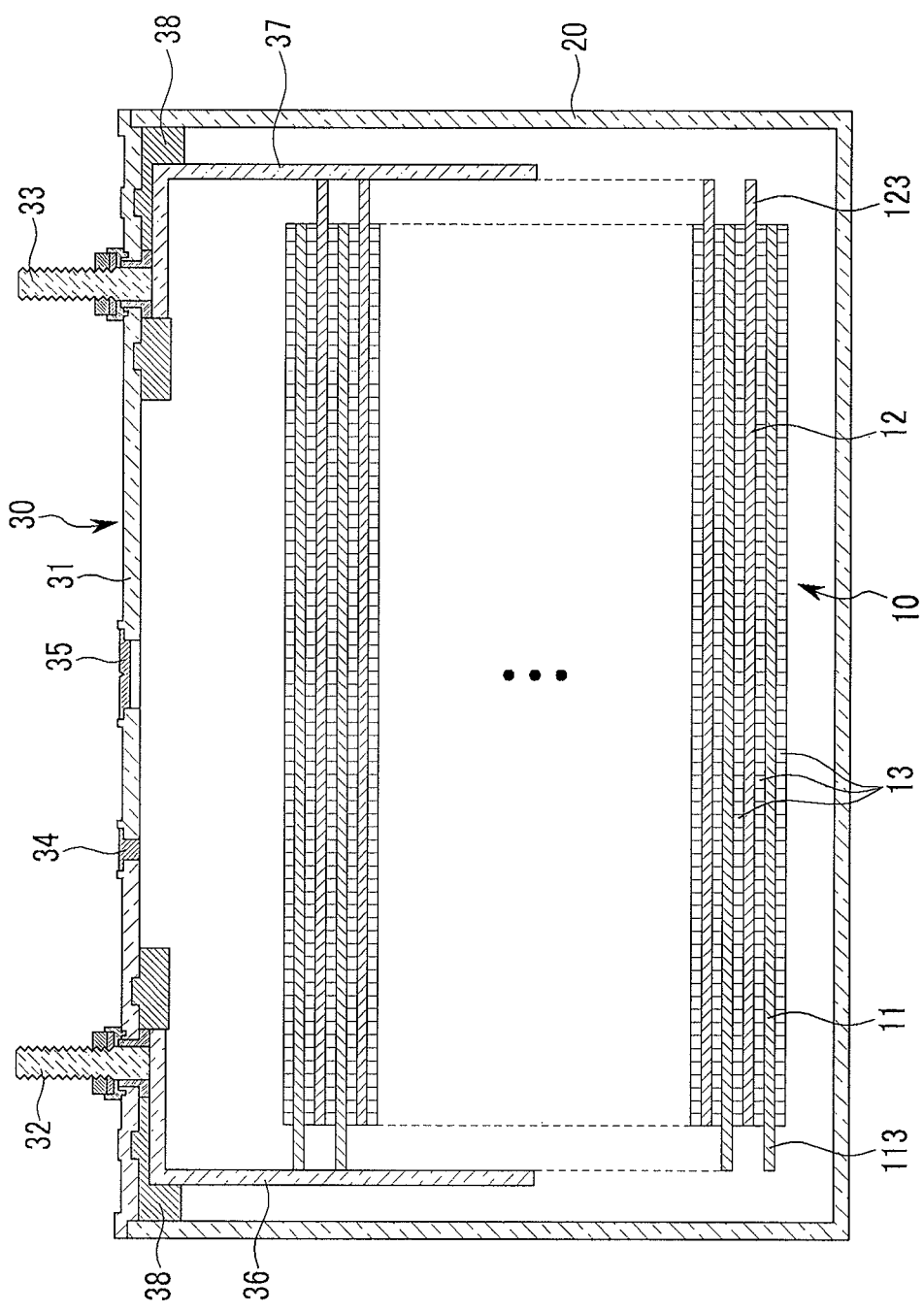
FIG. 2 is a cross-sectional view illustrating a coupled state of the rechargeable battery of FIG. 1.

FIG. 1 is an exploded perspective view of a rechargeable battery 100 according to a first exemplary embodiment of the present invention, and FIG. 2 is a cross-sectional view illustrating a coupled state of the rechargeable battery 100 of FIG. 1.

Referring to FIG. 1 and FIG. 2, the rechargeable battery 100 of the first exemplary embodiment includes an electrode assembly 10 formed of a positive electrode plate 11, a negative electrode plate 12, and a separator 13 that are wound in a jelly roll shape, a case 20 in which the electrode assembly 10 is installed, and a cap assembly 30 coupled to the case 20 to seal and close the case 20. The case 20 of the rechargeable battery 100 in the first exemplary embodiment is formed in a prismatic shape.

Figure 3:
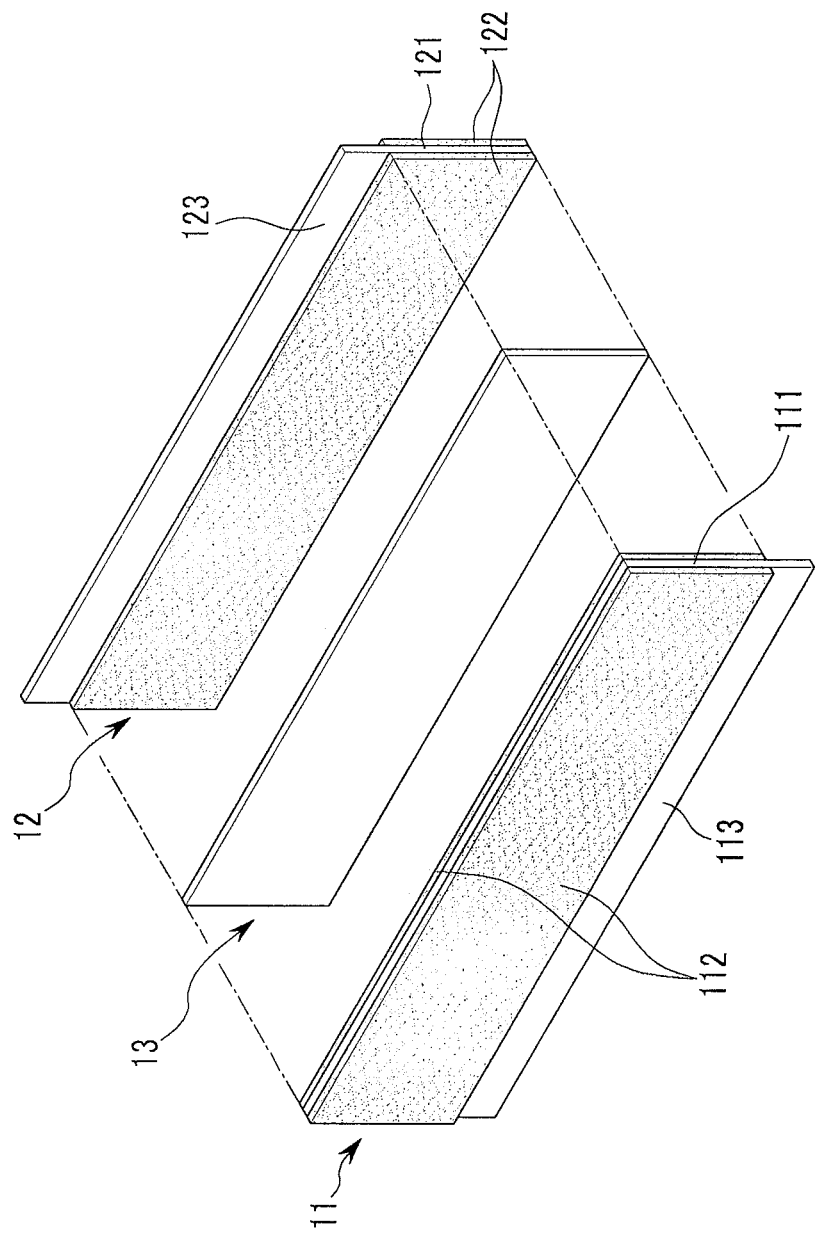
FIG. 3 is an exploded perspective view of an electrode assembly of the rechargeable battery of FIG. 1, illustrating a positive electrode plate, a negative electrode plate, and a separator in an unfolded state.

FIG. 3 is an exploded perspective view of the electrode assembly of the rechargeable battery 100 of FIG. 1, illustrating the positive electrode plate 11, the negative electrode plate 12, and the separator 13 in an unfolded state.

Referring to FIG. 3, the positive electrode plate 11 includes a first current collector 111 formed of a thin metal foil, and a positive electrode active material layer 112 formed in the first current collector 111. The positive electrode active material layer 112 is smaller than the first current collector 111 in width, and a positive electrode uncoated region 113 is located at one side end of the positive electrode plate 11 along a length direction of the positive electrode plate 11. The positive electrode uncoated region 113 is a region where a positive electrode active material is not coated. Here, the positive electrode active material layer 112 includes lithium, and the rechargeable battery 100 of the first exemplary embodiment rechargeable battery 100 is a lithium ion battery.

The negative electrode plate 12 includes a second current collector 121 formed of a thin metal foil, and a negative electrode active material layer 122 formed in the second current collector 121. The negative electrode active material layer 122 is formed to be smaller than the second current collector 121 in width, and a negative electrode uncoated region 123 is located at the other side end of the negative electrode plate 12 along a length direction of the negative electrode plate 12. The negative electrode uncoated region 123 is a region where a negative electrode active material is not coated.

The positive electrode plate 11 and the negative electrode plate 12 are spirally wound, interposing the separator 13 which is an insulator, such that the electrode assembly 10 is formed. In this case, the separator 13 is formed to be smaller than the first and second current collectors 111 and 121 in width, such that the positive electrode uncoated region 113 is exposed to one side end of the electrode assembly 10 that is wound in a jelly roll shape and the negative electrode 123 is exposed to the other side end of the electrode assembly 10.

Referring back to FIG. 1 and FIG. 2, the cap assembly 30 includes a cap plate 31 formed of a thin plate, a positive electrode terminal 32, and a negative electrode terminal 33. The positive and negative electrode terminals 32 and 33 are provided in the cap plate 31.

In the cap plate 31, an electrolyte injection opening through which an electrolyte solution is injected and a sealing cap 34 that seals and closes the electrolyte injection opening are provided. The positive electrode terminal 32 and the negative electrode terminal 33 are insulated from the cap plate 31 by insulation gaskets. In addition, a vent member 35 having a groove formed therein is formed in the cap plate 31 so that it can be broken according to a predetermined internal pressure level.

A positive electrode lead tab 36 and a negative electrode lead tab 37 are provided in the case 20. The positive electrode lead tab 36 is internally attached to the positive electrode uncoated region 113 of the electrode assembly 10 to electrically connect the positive electrode plate 11 and the positive electrode terminal 32, and the negative electrode lead tab 37 is attached to the negative electrode uncoated region 123 to electrically connect the negative electrode plate 12 and the negative electrode terminal 33. Insulation members 38 are provided between the cap plate 31 and the positive electrode lead tab 36 and between the cap plate and the negative electrode lead tab 37.

Figure 4:
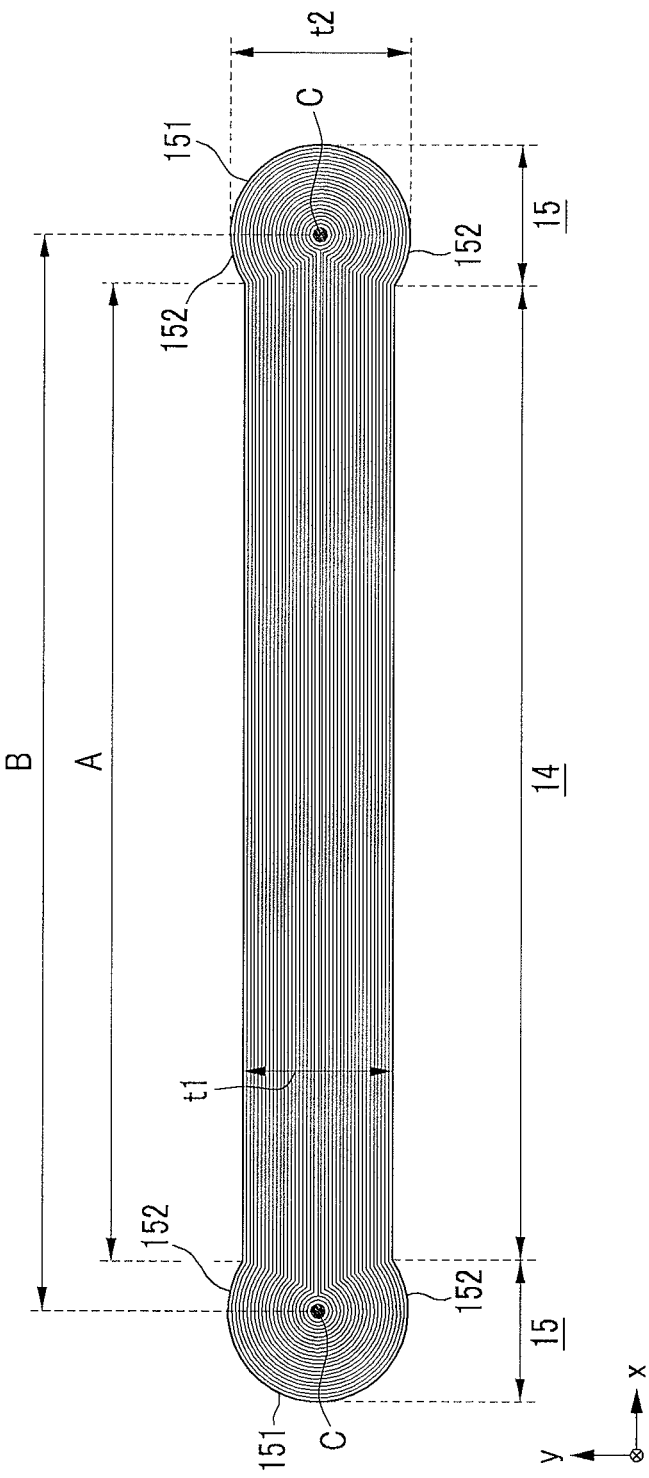
FIG. 4 is a side view of the electrode assembly of the rechargeable battery of FIG. 1.
Figure 5:
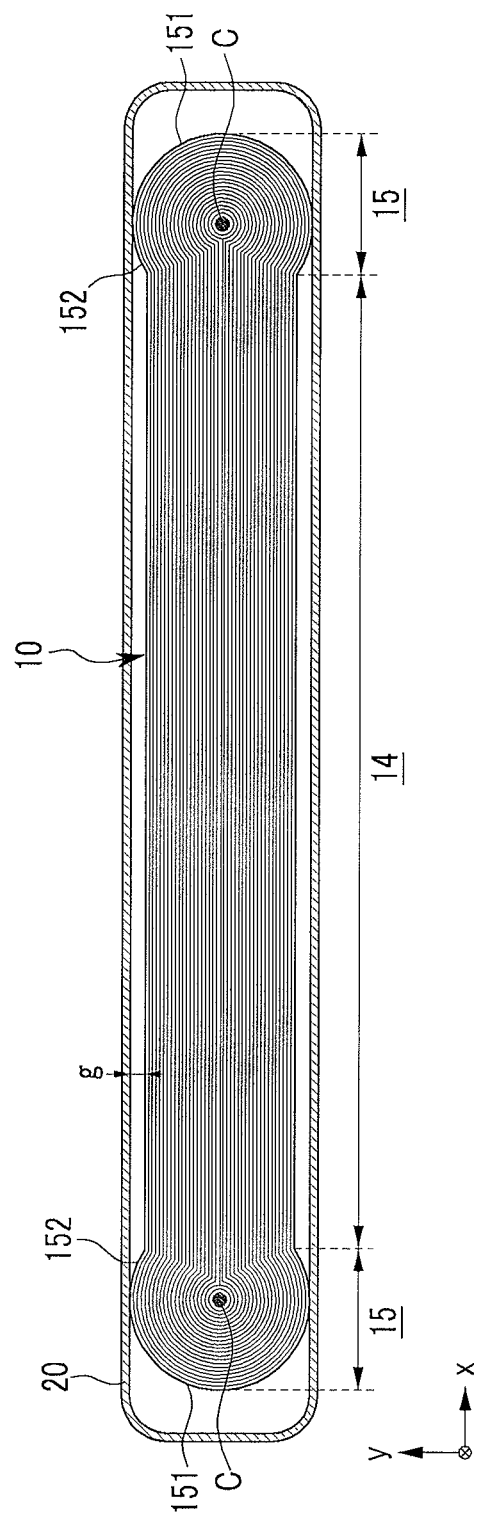
FIG. 5 is a cross-sectional view of the electrode assembly and a case of FIG. 1.

FIG. 4 is a side view of the electrode assembly 10 of the rechargeable battery 100 of FIG. 1, and FIG. 5 is a cross-sectional view of the electrode assembly 10 and the case 20 of the rechargeable battery 100 of FIG. 1.

Referring to FIG. 4 and FIG. 5, the electrode assembly 10 in the wound state is pressed flat to one direction. Particularly, since a center portion of the electrode assembly 10 is more pressed than lateral edge portions thereof, the electrode assembly 10 is not closely adhered to an internal wall of the case 20.

More particularly, the electrode assembly 10 includes a flat portion 14 having a constant thickness and curved portions 15 formed at respective sides of the flat portion 14, and the curved portions 15 are where the positive electrode plate 11, the negative electrode 12, and the separator 13 are circularly curved around 180 degrees to proceed in the opposite direction. In this case, a direction that is perpendicular to a side of the separator 13 located in the flat portion 14 is set as a first direction (y-axis direction of FIG. 4), and a thickness t1 of the flat portion 14 measured along the first direction is smaller than the maximum thickness t2 of the curved portion 15, measured along the first direction.

Therefore, the sides of the electrode assembly 10 are formed like a dumbbell, and the flat portion 14 in the pressed state has a predetermined gap (refer to g in FIG. 5) from the internal wall of the case 20 rather than being closely adhered thereto.

When the lithium ion battery is charged, the negative electrode active material layer 122 occludes lithium ions such that volume expansion occurs. In this case, since the flat portion 14 has a larger amount of negative electrode active material than the curved portion 15, the volume expansion rate of the flat portion 14 is larger than that of the curved portion 15. Therefore, a space between the flat portion 14 and the case 20 receives the volume expansion of the flat portion 14.

That is, the flat portion 14 expands while filling the space between the flat portion 14 and the case 20 when the rechargeable battery 100 is charged, and returns to the initial shape while slowly contracting when the rechargeable battery 100 is discharged. As described, the thickness t1 of the flat portion 14 is set to be smaller than the maximum thickness t2 of the curved portion 15 so that volume expansion of the flat portion 14 is not interrupted by the case 20.

As a result, the rechargeable battery 100 of the first exemplary embodiment is advantageous in application of a highly efficient negative electrode active material having a volume expansion rate of higher than 10%. The negative electrode active material layer 122 includes at least one negative electrode active material among silicon, a silicon oxide material, and a silicon-carbon composite.

The negative electrode active material can occlude and emit much more lithium ions than a negative electrode active material using a carbon-based material, and therefore a rechargeable battery having high capacity and high energy density can be manufactured. For example, pure silicon is known to have a high theoretical capacity of 4017 mAh/g. However, there has been a difficulty in practical use of the above-stated negative electrode active material because it greatly varies in volume during charging and discharging processes.

The shape of the electrode assembly 10 of the rechargeable battery 100 of the first exemplary embodiment is formed to easily receive the volume variation of the electrode assembly 10 in the case 20 so that the above negative active material can be used without restriction. Therefore, the rechargeable battery 100 according to the first exemplary embodiment can realize high capacity and high energy density by a negative active material having excellent efficiency, and can improve output efficiency.

The curved portion 15 of the electrode assembly 15 includes a first outmost curved portion 151 located outermost of a second direction (x-axis direction of FIG. 4) that is perpendicular to the first direction (y-axis direction of FIG. 4). The first outermost curved portion 151 may have a semi-circle shape.

If the curvature center of the first outermost curved portion 151 is a first center point (marked as C in FIG. 4), the flat portion 14 exists within a range of a distance between a pair of first center points C. That is, the width (refer to A of FIG. 4) of the flat portion 14, measured along the second direction (x-axis direction of FIG. 4), is smaller than a gap (refer to B of FIG. 4) of the pair of first center points C.

If the above-described condition is not satisfied, an inner portion of the curved portion 15, facing the flat portion 14, may be excessively deformed when the flat portion 14 and the curved portion 15 are formed by pressing the center portion of the electrode assembly 10. Therefore, the current collector may be broken or the active material may fall off at the inner portion. However, the flat portion 14 and the curved portion 15 of the rechargeable battery 100 according to the first exemplary embodiment have excellent shape stability by the width setting of the flat portion 14.

In addition, the curved portion 15 includes a second outermost curved portion 152 that connects the first outermost curved portion 151 and the flat portion 14. The curvature rate of the second outermost curved portion 152 is the same as that of the first outmost curved portion 151 in the first exemplary embodiment. The second outermost curved portion 152 may be formed to have the same curvature as the first outermost curved portion 151 by controlling the width of a pressing member (not shown) that presses the electrode assembly 10, to have a gap between a first center point C and the pressing member, and to have a pressing depth of the pressing member.

Figure 6:
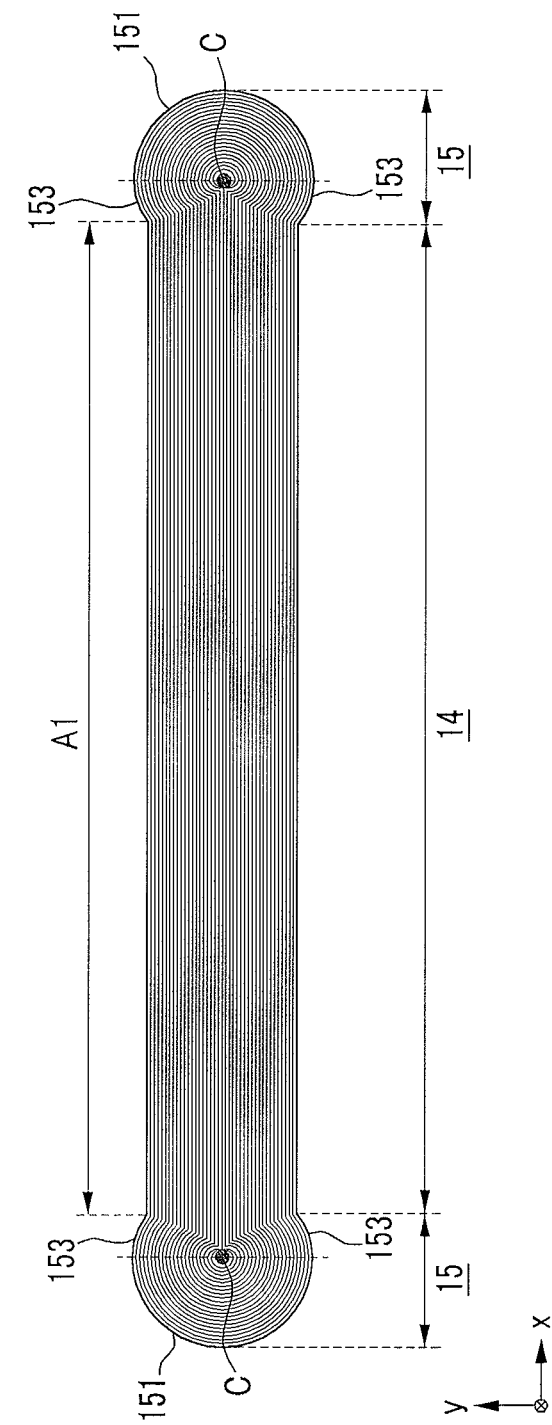
FIG. 6 is a side view of an electrode assembly of a rechargeable battery according to a second exemplary embodiment of the present invention.

FIG. 6 is a side view of an electrode assembly 10 of a rechargeable battery according to a second exemplary embodiment of the present invention.

Referring to FIG. 6, a rechargeable battery according to a second exemplary embodiment is formed of the same structure as of the rechargeable battery 100 of the first exemplary embodiment of the present invention, excluding that a curvature of a second outmost curved portion 153 is larger than that of the first outermost curved portion 151.

In the rechargeable battery of the second exemplary embodiment, a width A1 of a flat portion 14 along a second direction (the x-axis direction of FIG. 6) is greater than that of the first exemplary embodiment, and therefore volume variation of the flat portion 14 can be more easily received by enlarging an internal space of the case 20 that surrounds the flat portion 14.

Figure 7:
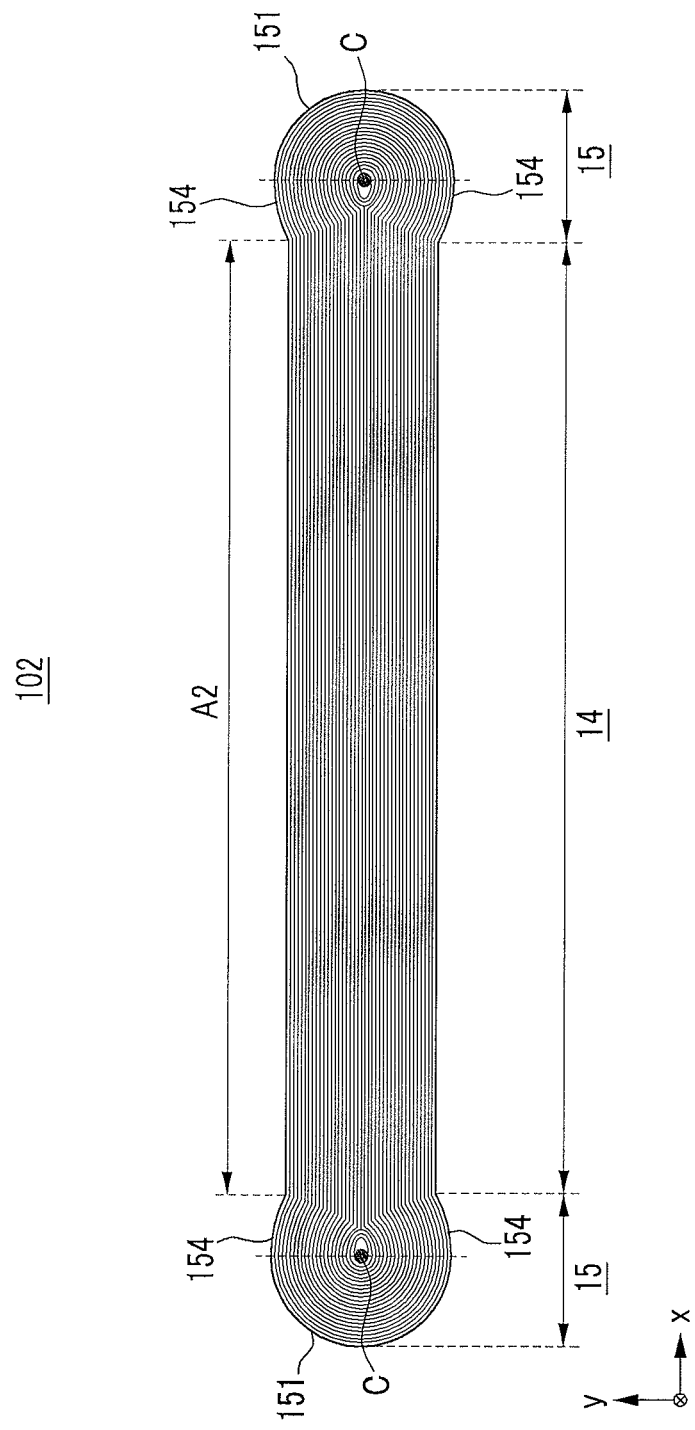
FIG. 7 is an electrode assembly of a rechargeable battery according to a third exemplary embodiment of the present invention.

FIG. 7 is a side view of an electrode assembly 102 of a rechargeable battery according to a third exemplary embodiment of the present invention.

Referring to FIG. 7, a rechargeable battery according to a third exemplary embodiment is formed as the same structure of the rechargeable battery 100 of the first exemplary embodiment, excluding that a curvature of a second outermost curved portion 154 is smaller than that of the first outermost curved portion 151.

In the rechargeable battery of the third exemplary embodiment, a width A2 of a flat portion 14 along a second direction (x-axis direction of FIG. 7) is smaller than that of the first exemplary embodiment so that an internal space of the case 20 that receives volume variation of the flat portion 14 is reduced, but an inner portion of a curved portion 15 connected to the flat portion 14 is gently curved so that defects such as damage to electrodes of the curved portion 15 or falling-off of an active material can be efficiently suppressed.

In the above-described first to third exemplary embodiments, as shown in FIG. 3, the positive electrode active material layer 112 and the negative electrode active material layer 122 have the same length of the corresponding current collectors 111 and 121 along a length direction thereof and are disposed in the entire area of the flat portion 14 and the curved portion 15. Alternatively, the positive electrode active material layer 112 and the negative electrode active material layer 122 may be intermittently formed in the electrode assembly 10.

Figure 8:
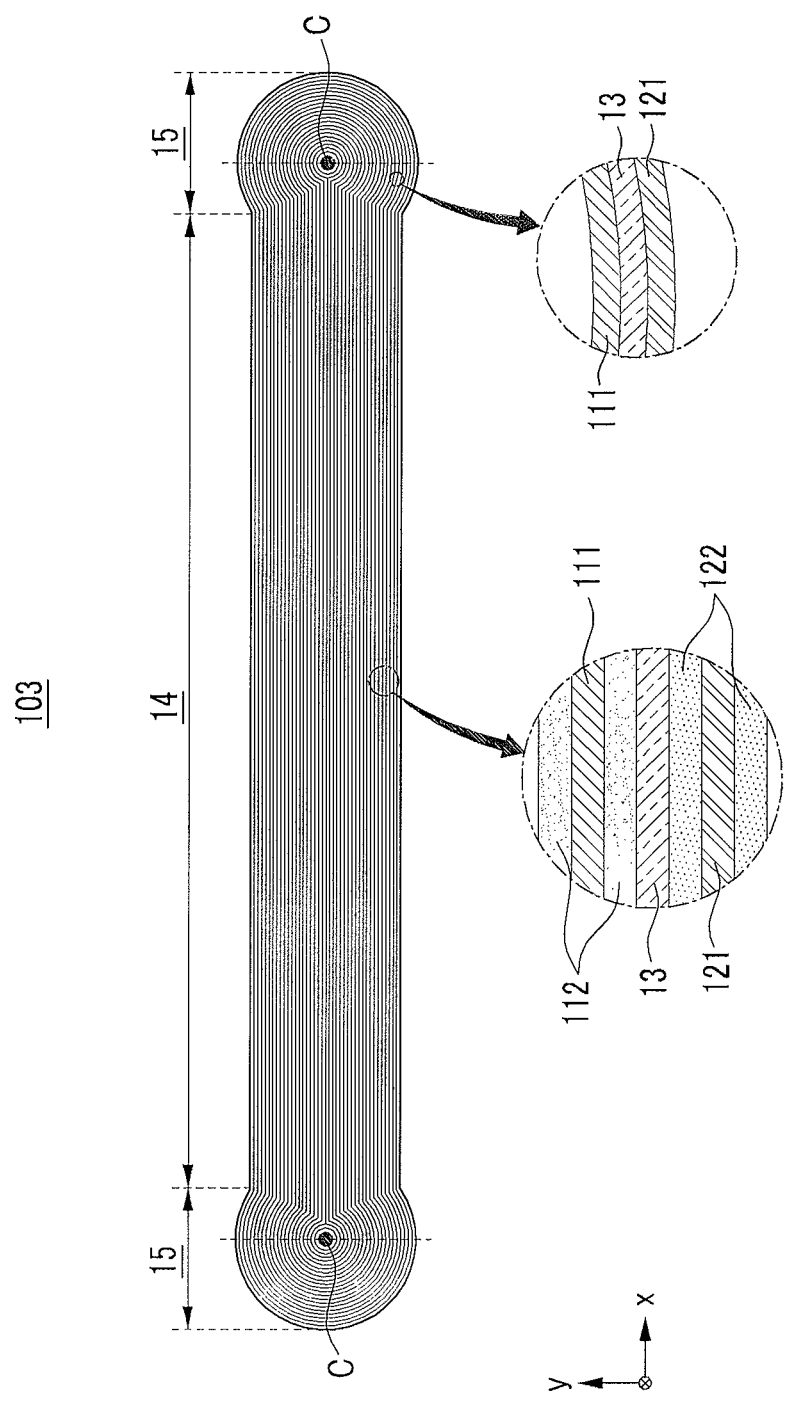
FIG. 8 is a cross-sectional view of an electrode assembly of a rechargeable battery according to a fourth exemplary embodiment of the present invention.

FIG. 8 is a cross-sectional view of an electrode assembly 103 of a rechargeable battery according to a fourth exemplary embodiment of the present invention.

Referring to FIG. 8, a rechargeable battery according to a fourth exemplary embodiment has the same structure as of the rechargeable battery of one of the above first to third exemplary embodiments, excluding that a positive electrode active material layer 112 and a negative electrode active material layer 122 are disposed only in a flat portion 14. FIG. 8 exemplarily shows an electrode assembly having a flat portion 14 and a curved portion 15 that have the same shape as the flat portion 14 and the curved portion 15 of the first exemplary embodiment.

The positive electrode active material layer 112 and the negative electrode active material layer 122 are not disposed in a curved portion, and accordingly volume variation of the curved portion 15 and electrode deformation due thereto can be suppressed so that the cycle-life characteristic of the rechargeable battery can be improved. Here, "the electrode" conceptually includes a positive electrode plate 11 and a negative electrode plate 12.

Figure 9:
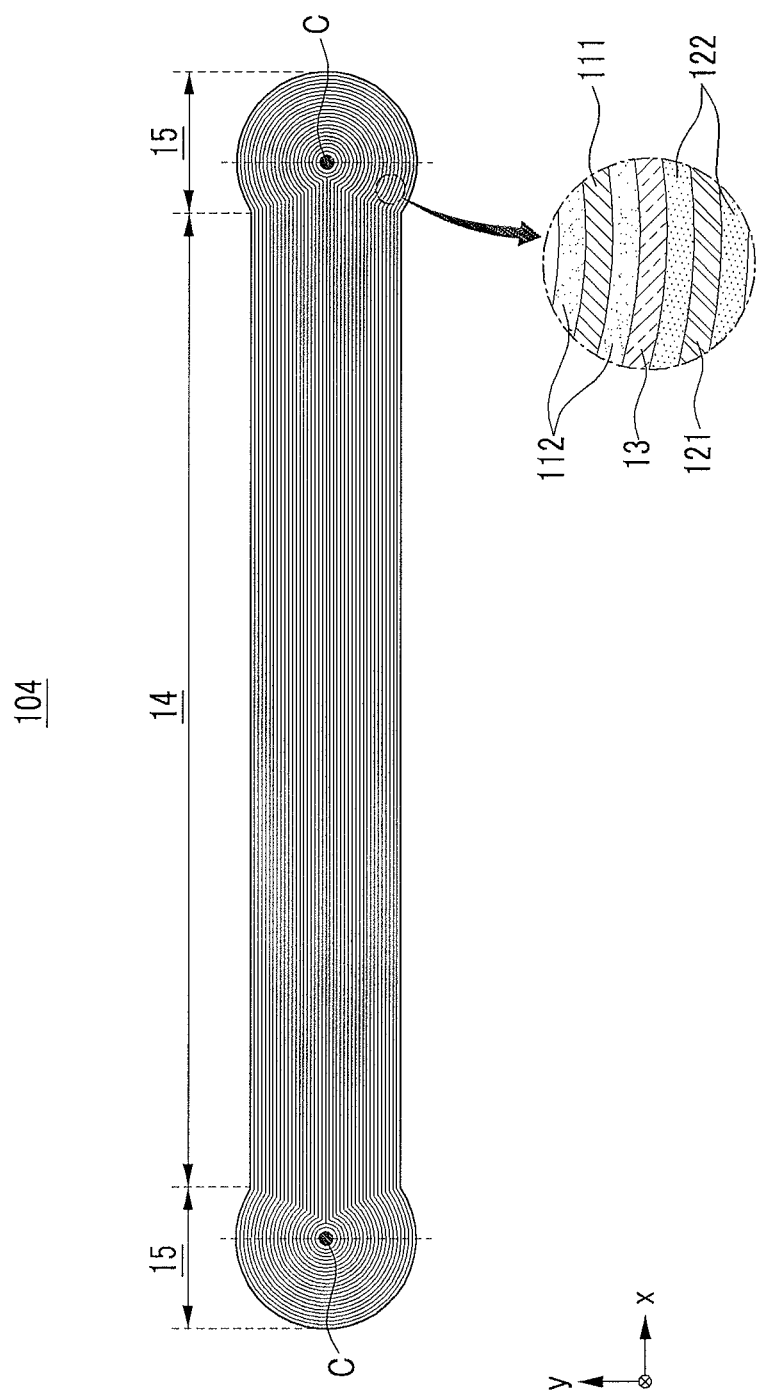
FIG. 9 is a cross-sectional view of an electrode assembly of a rechargeable battery according to a fifth exemplary embodiment of the present invention.

FIG. 9 is a cross-sectional view of an electrode assembly 104 of a rechargeable battery according to a fifth exemplary embodiment of the present invention.

Referring to FIG. 9, a rechargeable battery according to a fifth exemplary embodiment is formed of the same structure as of the rechargeable battery of the fourth exemplary embodiment, excluding that a positive electrode active layer 112 and a negative electrode active material layer 122 are disposed in a range of a flat portion 14 and between the flat portion 14 and a first center point C. In the rechargeable battery of the fifth exemplary embodiment, volume variation may occur in the curved portion 15 compared to the fourth exemplary embodiment, but volume of an active material can be increased so that capacity and energy density of the rechargeable can be increased.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A rechargeable battery comprising:
an electrode assembly having a positive electrode plate and a negative electrode plate and a separator interposed therebetween, wherein the electrode assembly is wound so as to define a first cross-sectional shape having two curved portions at lateral ends of the electrode assembly and a flat portion interposed between the two curved portions wherein the flat portion has a thickness dimension that is less than the thickness dimension of either of the curved portions wherein the curved portions define a first outermost curved portion located in an outermost portion of a second direction and a second outermost curved portion that interconnects the first outermost curved portion to the flat portion wherein the center points define the center of curvature of the first outermost curved portions and wherein the curvature of the second outermost curved portion is larger than that of the first outermost curved portion and wherein the second outermost curved portion curves inward of the first outermost curved portion towards the less thick flat portion along the larger radius of curvature wherein the less thick flat portion extends the entire length of the battery along a direction that is substantially perpendicular to the plane of the cross-sectional shape
a case having an interior for receiving the electrode assembly, and
a cap assembly that is positioned on the case
wherein the less thick flat portion of the electrode assembly is spaced further from the interior walls of the case than the curved portions to accommodate swelling of the flat portion of the electrode assembly during charging of the electrode assembly and wherein the flat portion is compressed together so as to define a continuous mass across the less thick flat portion that is denser than the curved portions across the length of the battery, and
wherein the thickness dimension of the flat portion and the thickness direction of the curved portions are measured along a first direction that is substantially perpendicular to the flat portion of the electrode assembly,
wherein the curved portions are spaced along a second direction that is substantially perpendicular to the first direction and wherein the curved portions define center points,
wherein the flat portion has a length extending along the second direction that is less than the distance between the center points of the curved portions,
wherein the positive electrode plate and the negative electrode plate includes a positive active material layer and a negative active material layer respectively and wherein the negative active material layer includes a material that has a volume expansion rate of higher than 10% during charging of the electrode assembly wherein the compressed less thick flat portions that define the continuous mass includes positive electrode plates and negative electrode plates.

2. The battery of claim 1, wherein the positive and negative active material layers are formed over the flat portion and the curved portions of the electrode assembly.

3. The battery of claim 1, wherein the positive and negative active material layers are only formed in the flat portion of the electrode assembly.

4. The battery of claim 1, wherein the curved portions define centerpoints and the positive and negative active material layers are formed so as to extend between the center points of the curved portion through the flat portion.

5. The battery of claim 1, wherein the negative active material includes at least one selected from the group consisting of silicon, silicon oxide material and a silicon-carbon composite.

6. An electrode assembly for a rechargeable battery, the electrode assembly having a positive and negative electrode plates and a separator interposed therebetween, wherein the electrode plates and the separator are wound so that the resulting wound electrode assembly defines a first cross-sectional shape having a first curved portion, a second curved portion and a flat portion interposed between the first and second curved portions and wherein the flat portion has a thickness dimension that is less than the thickness dimension of the first and second curved portions wherein the first and second curved portions define a first outermost curved portion located in an outermost portion of the second direction and a second outermost curved portion that interconnects the first outermost curved portion to the flat portion wherein the center points define the center of curvature of the first outermost curved portions and wherein the curvature of the second outermost curved portion is larger than that of the first outermost curved portion and wherein the second outermost curved portion curves inward of the first outermost curved portion towards the less thick flat portion along the larger radius of curvature wherein the less thick flat portion extends the entire length of the battery along a direction that is substantially perpendicular to the plane of the cross-sectional shape wherein the less thick flat portion of the electrode assembly is spaced further from the interior walls of the case than the curved portions and wherein the flat portion is compressed together so as to define a continuous mass across the less thick flat portion and wherein the less thick flat portion is denser than the curved portions across the length of the battery, wherein the thickness dimension of the flat portion and the thickness direction of the curved portions are measured along a first direction that is substantially perpendicular to the flat portion of the electrode assembly, wherein the curved portions are spaced along a second direction that is substantially perpendicular to the first direction and wherein the curved portions define center points, wherein the flat portion has a length extending along the second direction that is less than the distance between the center points of the curved portions, and wherein the positive electrode plate and the negative electrode plate includes a positive active material layer and a negative active material layer respectively and wherein the negative active material layer includes a material that has a volume expansion rate of higher than 10 % during charging of the electrode assembly wherein the compressed less thick flat portions that define the continuous mass includes positive electrode plates and negative electrode plates.

7. The electrode assembly of claim 6, wherein the positive and negative active material layers are formed over the flat portion and the curved portions of the electrode assembly.

8. The electrode assembly of claim 6, wherein the positive and negative active material layers are only formed in the flat portion of the electrode assembly.

9. The electrode assembly of claim 6, wherein the curved portions define centerpoints and the positive and negative active material layers are formed so as to extend between the center points of the curved portion through the flat portion.

10. The electrode assembly of claim 6, wherein the negative active material includes at least one selected from the group consisting of silicon, silicon oxide material and a silicon-carbon composite.

11. The battery of claim 1, wherein the case has prismatic shape.

\* \* \* \* \*